United States Patent [19]

Kondo et al.

[11] Patent Number: 4,782,112
[45] Date of Patent: Nov. 1, 1988

[54] SILICONE WATER-BASED EMULSION COMPOSITION

[75] Inventors: Hidetoshi Kondo, Ichihara; Taro Koshii, Chiba, both of Japan

[73] Assignee: Toray Silicone Company, Ltd., Tokyo, Japan

[21] Appl. No.: 116,429

[22] Filed: Nov. 3, 1987

[30] Foreign Application Priority Data

Oct. 11, 1986 [JP] Japan .................. 61-267034

[51] Int. Cl.$^4$ .................. C08L 83/07; C08L 83/06; C08L 83/05
[52] U.S. Cl. .................. 524/837; 524/861; 524/862
[58] Field of Search .................. 524/837, 861, 862

[56] References Cited

U.S. PATENT DOCUMENTS

| | | |
|---|---|---|
| 3,355,406 | 11/1967 | Cekada . |
| 4,098,701 | 7/1978 | Burrill .................. 524/861 |
| 4,177,176 | 12/1979 | Burrill .................. 524/837 |
| 4,221,688 | 9/1980 | Johnson et al. . |
| 4,427,811 | 1/1984 | Elias et al. . |
| 4,618,645 | 10/1986 | Bauman .................. 524/837 |
| 4,624,900 | 11/1986 | Fau .................. 524/861 |
| 4,661,556 | 4/1987 | Huebner .................. 524/837 |
| 4,677,160 | 6/1987 | Kondo .................. 524/860 |

*Primary Examiner*—C. Warren Ivy
*Attorney, Agent, or Firm*—Edward C. Elliott

[57] ABSTRACT

The water-repellent silicone water-based emulsion composition of the present invention consists of a mixture of (A) a silicone water-based emulsion composed of water, emulsifying agent, and diorganopolysiloxane having at least 2 silicone-bonded hydroxyl groups in each molecule, (B) a silicone water-based emulsion composed of water, emulsifying agent, and organohydrogenpolysiloxane having at least 2 silicon-bonded hydrogen atoms in each molecule, and (C) curing catalyst. It is characterized by an excellent storage stability, and by the formation on curing of a rubbery elastomeric coating film which has an excellent alkali resistance, water repellency, water-repellant sealability, and durability of adhesion.

4 Claims, No Drawings

SILICONE WATER-BASED EMULSION COMPOSITION

BACKGROUND OF THE INVENTION

1. Field of the Invention

The present invention relates to a silicone water-based emulsion composition which provides a water-repellent material which cures upon the removal of water to afford a rubbery elastomer.

2. Background Information

A number of water-repellent silicon water-based emulsion compositions which are cured into rubbery elastomers after the removal of water have been proposed or provided in the prior art. U.S. Pat. No. 3,355,406, issued Nov. 28, 1967, teaches silicone rubber latexes reinforced by adding silsesquioxane. In example 19, a composition of hydroxyl endblocked polydiorganosiloxane, silsesquioxane, methylhydrogenpolysiloxane, and dibutyltin dilaurate is taught. Upon evaporation of the water from a film of the latex, a silicone rubber film was left. U.S. Pat. No. 4,221,688, issued Sept. 9, 1980, (equivalent to Japanese Patent Application Laid Open Number 56-16553 [16,553/81]) proposes a silicone water-based emulsion composition which is based on hydroxyl group-terminated diorganopolysiloxane, colloidal silica, and an alkyltin salt. U.S. Pat. No. 4,427,811, issued Jan. 24, 1984, (Japanese Patent Application Laid Open Number 58-118853 [118,853/83]) discloses an improved method for producing a high solids silicone water-based emulsion composition.

However, a number of problems arise in connection with these prior water-repellent silicone water-based emulsion compositions. Thus, their cured coatings are not resistant to alkali, and their adhesive strength will decline with time and the physical properties of the coatings themselves will deteriorate when they are applied on alkaline substrates such as concrete, etc. Also, these prior water-repellent silicone water-based emulsion compositions have poor storage stabilities, and the cured coatings obtained after prolonged periods of storage will have high hardnesses and thus reduced elongations.

Accordingly, the present inventors conducted research with a view to eliminating the above problems, and the present invention was developed as a result.

SUMMARY OF THE INVENTION

This invention relates to a silicone water-based emulsion composition consisting of a mixture of a silicone water-based emulsion composed of emulsifying agent, water and diorganosiloxane having at least 2 silicon-bonded hydroxyl groups in each molecule; a silicone water-based emulsion composed of emulsifying agent, water, and organohydrogenpolysiloxane having at least 2 silicon-bonded hydrogen atoms in each molecule; and a curing catalyst.

The object of the present invention is to provide a water-repellent silicone water-based emulsion composition which has an excellent storage stability at room temperature, and which cures to form a rubbery elastic coating film having an excellent alkali resistance, water repellency, water-repellent sealing activity, and adhesion.

DESCRIPTION OF THE INVENTION

The aforesaid object of the present invention is accomplished by means of a silicone water-based emulsion composition which provides a water-repellent material, said composition consisting of the mixture of (A) a silicone water-based emulsion composed of emulsifying agent, water, and diorganopolysiloxane having at least 2 silicon-bonded hydroxyl groups in each molecule; (B) a silicone water-based emulsion composed of emulsifying agent, water, and organohydrogenpolysiloxane having at least 2 silicon-bonded hydrogen atoms in each molecule, containing 1 or less weight percent silicon-bonded hydrogen atoms in each molecule, and having no aliphatically unsaturated hydrocarbon groups; and (C) curing catalyst.

In explanation of the preceding, component (A) is the component which develops rubbery elasticity upon curing in a dehydrogenation reaction with component (B), the crosslinker, under the catalytic activity of component (C). Component (A) is a silicone water-based emulsion composed of emulsifying agent, water, and diorganopolysiloxane having at least 2 silicon-bonded hydroxyl groups in each molecule. In order to obtain a single-liquid water-repellent silicone water-based emulsion composition having an improved storage stability as the water-repellent composition, it is necessary that the water-based emulsion comprising components (A) be prepared in advance separately from component (B) and component (C) and then be mixed with components (B) and (C). No specific restriction obtains on the position at which the hydroxyl groups are bonded in the diorganopolysiloxane of component (A), but their presence at both terminals is preferred. The other organic groups bonded to silicon will be substituted or unsubstituted monovalent organic groups such as alkyl groups, for example, methyl, ethyl, propyl, butyl, etc.; alkenyl groups, for example, vinyl, allyl, etc.; aryl groups such as phenyl, etc.; aralkyl groups such as benzyl, etc.; alkaryl groups such as styryl, tolyl, etc.; cycloalkyl groups such as cyclohexyl, cyclopentyl, etc.; and these groups in which all or part of the hydrogen atoms have been replaced by halogen (for example, fluorine, chlorine, bromine) such as, for example, 3-chloropropyl and 3,3,3-trifluoropropyl. These organic groups are typically methyl, vinyl, and phenyl, but they need not all be the same and different types of organic groups can be used in combination. It is preferred that the molecular structure be essentially straight chain, meaning a straight chain or a slightly branched straight chain. Also, while the molecular weight is not specifically restricted, it is preferably greater than 5,000. The tensile strength and elongation required of a water-repellent composition are obtained at molecular weights greater than 30,000, and the best tensile strength and elongation are developed at molecular weights greater than 50,000. Concrete examples of this organopolysiloxane are hydroxyl-terminated dimethylpolysiloxanes, hydroxyl-terminated methylphenylpolysiloxanes, hydroxyl-terminated methylvinylpolysiloxanes, and hydroxyl-terminated dimethylsiloxane-methylvinylsiloxane copolymers. These organopolysiloxanes can be synthesized, for example, by the ring-opening polymerization of organosiloxane cyclics, by the hydrolysis of linear or branched organopolysiloxane having hydrolyzable groups, such as alkoxy, acyloxy, etc., or by the hydrolysis or one or more types of diorganohalosilane.

The emulsifying agent in component (A) functions to emulsify the diorganopolysiloxane having at least 2 silicon-bonded hydroxyl groups in each molecule, and this emulsifying agent encompasses the anionic, nonionic, and cationic emulsifying agents. Examples of the anionic emulsifying agents are higher fatty acid salts, the salts of sulfate esters of higher alcohols, alkylbenzenesulfonic acid salts, alkylnaphthalenesulfonic acid salts, alkyl sulfones, and the salts of sulfate esters of polyethylene glycol. Examples of the nonionic emulsifying agents are polyoxyethylene alkylphenyl ethers, sorbitan fatty acid esters, polyoxyethylene sorbitan fatty acid esters, polyoxyalkylene fatty acid esters, polyoxyethylenepolyoxypropylenes, and fatty acid monoglycerides. Examples of the cationic emulsifying agents are fatty acid amine salts, quaternary ammonium slats, and alkylpyridinium salts. One or more types of these emulsifying agents can be used in the present invention. The quantity of use will generally be in the range of 0.2 to 30 weight parts per 100 weight parts of the diorganopolysiloxane having at least 2 silicon-bonded hydroxyl groups in each molecule.

No specific restriction obtains on the water in component (A) as long as a sufficient quantity is present to emulsify the diorganopolysiloxane having at least 2 silicon-bonded hydroxyl groups in each molecule.

Component (B) functions as a crosslinker for component (A). This component is itself a silicone water-based emulsion which consists of an emulsifying agent, water, and organohydrogenpolysiloxane having at least 2 silicon-bonded hydrogen atoms in each molecule. In order to obtain a single-liquid water-repellent silicone water-based emulsion composition having an improved storage stability as the water-repellent composition, it is necessary that the emulsion comprising component (B) be prepared in advance separately from component (A) and component (C) and then be mixed with components (A) and (C). The hydrogen atoms may be bonded in the organohydrogenpolysiloxane of component (B) at the molecular terminals or along the chain or at both positions. The silicon-bonded organic groups are to be monovalent hydrocarbon groups as exemplified by alkyl groups such as methyl, ethyl, propyl, and octyl, etc.; aryl groups such as phenyl, etc.; and substituted alkyl groups such as 3,3,3-trifluoropropyl, etc.; but are not to contain aliphatically unsaturated hydrocarbon moieties. In general, the molecular configuration will be straight chain or cyclic, but the use of branched or network material is permissible. Also, the use is permissible of 1 type or the mixture of 2 or more types.

The viscosity of this organohydrogenpolysiloxane is to fall within the range of 1 to 1,000,000 centipoise at 25° C. The volatility is too high at below 1 centipoise, with the result that the content of component (B) in the water-repellent silicone water-based emulsion composition will be unstable. On the other hand, the industrial productivity is substantially reduced at above 1,000,000 centipoise. It is preferred that the proportion of hydrogen atoms in each organohydrogenpolysiloxane molecule be less than 1 weight precent. When 1 weight percent is exceeded, the water-repellent silicone water-based emulsion composition suffers from a decline in storage stability, and may even gel during long-term storage.

The emulsifying agent of component (B) functions to emulsify the organohydrogenpolysiloxane of component (B), and encompasses the nonionic and cationic emulsifying agents. The nonionic and cationic emulsifying agents listed for component (A) above are likewise used as the instant emulsifying agents. Trimethylnonanol is particularly preferred. Anionic emulsifying agents are undesirable because they adversely affect the stability of the organohydrogenpolysiloxane. These emulsifying agents are generally used within the range of 0.2 to 30 weight parts per 100 weight parts organohydrogenpolysiloxane.

No specific restriction obtains on the water in component (B) as long as the quantity present is sufficient to emulsify the organohydrogenpolysiloxane in component (B) in the presence of the emulsifying agent.

Component (B) is added in sufficient amount to provide at least one hydrogen atom for each hydroxyl group in the diorganopolysiloxane of component (A). It is preferred that an excess of component (B) is provided too so that all of the hydroxyl groups can be reacted. Preferred is sufficient component (B) to give from 0.5 to 5 weight parts of the organohydrogenpolysiloxane of component (B) per 100 weight parts of diorganopolysiloxane of component (A).

The curing catalyst comprising component (C) functions to promote the condensation reaction between component (A) and component (B). An exemplary list includes organic acid metal salts such as dibutyltin dilaurate, dibutyltin diacetate, tin octanoate, dibutyltin dioctate, tin laurate, ferric stannooctanoate, lead octanoate, lead laurate, zinc octanoate, etc.; titanic acid esters such as tetrabutyl titanate, tetrapropyl titanate, dibutoxytitanium bis(ethyl acetoacetate), etc.; and amino compounds such as n-hexylamine and guanidine and their hydrochlorides, etc. Furthermore, it is preferred that the curing catalyst be converted into an emulsion in advance using both an emulsifying agent and water.

Component (C) is generally added within the range of 0.01 to 5 weight parts and preferably 0.05 to 2 weight parts per 100 weight parts of component A's diorganopolysiloxane having at least 2 silicon-bonded hydroxyl groups in each molecule.

To prepare the water-repellent silicone water-based emulsion composition of the present invention, one begins with the preparation of the silicone water-based emulsion comprising component (A). This can be achieved by various methods known in the art. For example, the hydroxyl-terminated diorganopolysiloxane can be emulsified in water using the emulsifying agent and an emulsifying device such as a homomixer, homogenizer, colloid mill, etc. Alternatively, a cyclic diorganopolysiloxane, such as octamethylcyclotetrasiloxane, etc., can be emulsified in water using an emulsifying agent, and this can then be polymerized with the addition of a ring-opening polymerization catalyst to afford an emulsion of hydroxyl-terminated diorganopolysiloxane. The silicone water-based emulsion comprising component (B) is then prepared separately from the preceding, for example, by emulsifying the organohydrogenpolysiloxane in water using the emulsifying agent and an emulsifying device such as a homomixer, homogenizer, colloid mill, etc. The water-repellent silicone water-based emulsion composition is then obtained by mixing components (A), (B), and (C) to homogeneity using a mixer such as a Cowles dissolver, drum roller, etc. Although at this point the generation of hydrogen gas may appear after mixing, the composition becomes a stable water-repellent silicone water-based emulsion composition, which will no longer generate hydrogen gas, upon standing at room temperature while open for 1 week.

It is permissible to blend into the water-repellent silicone water-based emulsion composition of the present invention those components which are blended into typical water-repellent compositions, for example, fillers such as calcium carbonate, clay, aluminum oxide, aluminum hydroxide, quartz, mica, carbon black, graphite, titanium dioxide, zinc oxide, iron oxide, etc.; dispersants such as sodium polyacrylate, glycidyl methacrylate, sodium tetrapolyphosphate, etc.; silane coupling agent adhesion promoters such as gamma-glycidoxypropyltrimethoxysilane, methyltrimethoxysilane, vinyltrimethoxysilane, etc.; short fibers for the purpose of imparting an irregular pattern, for example, asbestos, rock wool, pulp, glass wool, slag wool, nylon fiber, rayon fiber, vinylon fiber, etc.; defoamers; pigments; paints; preservatives; antifreezes; etc.

The water-repellent silicone water-based emulsion composition produced as above has an excellent stability in storage at room temperature, and cures into a rubbery elastomer at room temperature by the removal of water to afford a coating film having an excellent alkali resistance. Accordingly, the water-repellent silicone water-based emulsion composition of the present application for invention is suitable for use as a protective coating for various substrates, and particularly as a water-repellent material in construction and civil engineering.

The following examples are included for illustrative purposes only and should not be construed as limiting the invention which is properly set forth in the appended claims. In the examples, parts are parts by weight.

Example 1

To obtain component (A), 2 parts sodium lauryl sulfate and 70 parts water were mixed into 100 parts hydroxyl-terminated dimethylpolysiloxane (number of siloxane repeat units were about 30), followed by passage through an homogenizer twice at a pressure of 300 kg/cm$^2$. Then 1 part dodecylbenzenesulfonic acid was added as polymerization initiator and the emulsion was allowed to polymerize at room temperature for 16 hours. The pH was then adjusted to 7 by the addition of aqueous sodium hydroxide to the obtained polymer emulsion to afford a silicone water-based emulsion (silicone water-based emulsion A) which contained hydroxyl-terminated dimethylpolysiloxane having a molecular weight of approximately 200,000.

To obtain component (B), 89 parts water and 1 part trimethylnonanol emulsifying agent were added and mixed into 10 parts of a trimethylsiloxy-terminated methylhydrogenpolysiloxane (number of siloxane repeat units were about 10) having 0.75 weight percent silicon-bonded hydrogen atoms, followed by passage twice through an homogenizer at a pressure of 300 kg/cm$^2$ to prepare a methylhydrogenpolysiloxane-containing silicone water-based emulsion (silicone water-based emulsion B).

To prepare component (C), 40 parts dioctyltin dilaurate, 10 parts sodium lauryl sulfate, and 40 parts water were mixed, and the mixture was passed through an homogenizer to afford a curing catalyst (water-based curing catalyst emulsion C).

A mixture was prepared from 100 parts silicone water-based emulsion A, 25 parts aqueous silica (20 percent solids) stable in the neutral region (reinforcing filler), 1.5 parts water-based curing catalyst emulsion C, and 5.5 parts silicone water-based emulsion B by mixing to homogeneity and standing open at room temperature for 1 week to provide for the completion of hydrogen gas evolution, thus affording a water-repellent silicone water-based emulsion composition. This material did not generate any more hydrogen over a 6 month period, and thus was a stable composition. One month after production, this was cast into a 1 mm thick sheet, and was cured and hardened at room temperature for 4 weeks. The properties were then measured in accordance with JIS K 6301, and these results are reported in Table 1. Also, Table 1 reports the results from measurement of the properties on this sheet after immersion in 5 percent aqueous sodium hydroxide for 1 week. One concludes from Table 1 that the water-repellent silicone water-based emulsion composition of the invention has a good alkali resistance.

TABLE 1

| | Alkali Resistance Test | | |
|---|---|---|---|
| | properties | | |
| test conditions | hardness (JIS) | tensile strength (kg/cm$^2$) | elongation (percent) |
| initial (RT, 1 month) | 11.5 | 7.1 | 620 |
| alkali resistance (5 percent NaOH, 1 week) | 10 | 7.3 | 560 |

Comparison Example 1

First, 25 parts aqueous silica (30 weight percent solids) stable in the alkaline region and 0.3 parts water-based curing catalyst emulsion C as used in Example 1 as component (C) were added and mixed into 100 parts of the silicone water-based emulsion A as used in Example 1 as component (A). The pH was then adjusted to 11 by the addition of a small amount of diethylamine, followed by aging at room temperature for 2 weeks to afford a water-repellent silicone water-based emulsion composition. One month after production, this was cast into a 1 mm thick sheet, and was cured and hardened at room temperature for 4 weeks. The properties were measured in accordance with JIS K 6301, and these results are reported in Table 2. Table 2 also reports the results from the measurement of the properties of this sheet after immersion in 5 percent aqueous sodium hydroxide for 1 week. One concludes that the water-repellent composition of this comparison example is less resistant to alkali than the invention's water-repellent composition of Example 1.

TABLE 2

| | Alkali Resistance Test | | |
|---|---|---|---|
| | properties | | |
| test conditions | hardness (JIS) | tensile strength (kg/cm$^2$) | elongation (percent) |
| initial (RT, 1 month) | 27 | 9.2 | 410 |
| alkali resistance (5 percent NaOH, 1 week) | 14 | 1.4 | 110 |

Example 2

As a first step, 10 parts of the silicone water-based emulsion B as in Example 1 and 1 part of the curing catalyst emulsion C as in Example 1 were added to and mixed to homogeneity into 100 parts of the silicone water-based emulsion A as in Example 1. Standing open at room temperature for 1 week afforded a stable water-repellent silicone water-based emulsion composition. To this were added 1 part fumed silica as a reinforcing filler and 95 parts suspensible calcium carbonate as an extending filler, followed by mixing to homogeneity to prepare a water-repellent silicone water-based emulsion composition. This composition was filled into cartridges, and no hydrogen evolution was observed even upon standing for 6 months, indicating that the composition was stable.

The adhesiveness of this water-repellent silicone water-based emulsion composition was then evaluated according to JIS A 5758. Test specimens were manufactured according to JIS A 5758. Mortar plates were prepared by casting mortar into sheets 10 millimeters thick and curing, then cutting the cured sheets into pieces 50 millimeters square. Test specimens were manufactured by placing a wood spacer, having a thickness of 12 millimeters, a width of 38 millimeters, and a length of 50 millimeters, between two mortar plates, thus creating space 12 millimeters wide and 12 millimeters deep between the mortar plates at one edge. This space was then filed with emulsion composition to bind the mortar plates together. The test specimens were produced after a porous-surface primer (Primer B from Toray Silicone Co., Ltd.) had been applied and dried on the mortar surfaces that would contact the emulsion. After preparation, the test specimen was cured at room temperature for 4 weeks, and then installed in a tensile tester. Tensile testing was carried out using a Tensilon UTM-1-2500 machine at 20° C. at a tensile rate of 50 mm/min. These results are reported in Table 3.

The storage stability of the composition was also evaluated. The storage stability was evaluated by casting the water-repellent silicone water-based emulsion composition of the invention into a 1 mm thick sheet, followed by hardening and curing for 4 weeks at room temperature and measurement of the properties of the cured material in accordance with JIS K 6301. These results are reported in Table 4. The water-repellent silicone water-based emulsion composition of the present invention had satisfactory properties even 8 months after production, and accordingly had an excellent storage stability.

TABLE 3

| Mortar Butt Joint Adhesion Test | | |
|---|---|---|
| breaking strength | (kg/cm$^2$) | 2.0 |
| 150 percent modulus | (kg/cm$^2$) | 0.9 |
| elongation | (percent) | 600 |
| adhesive cohesion | | thin layer cohesive rupture |

TABLE 4

| | Storage Stability Test | | |
|---|---|---|---|
| | | properties | |
| test conditions | hardness (JIS) | tensile strength (kg/cm$^2$) | elongation (percent) |
| room temperature, after 1 month | 14 | 9.6 | 1100 |
| room temperature, after 8 months | 16 | 10.2 | 940 |

Comparison Example 2

As a first step, 0.3 parts silicone water-based emulsion C produced as in Example 1 and 5 parts aqueous silica (30 weight percent solids) stable in the alkaline region were added and mixed into 100 parts silicone water-based emulsion A produced as in Example 1. The pH was adjusted to 11 by the addition of a small amount of diethylamine, followed by aging at room temperature for 2 weeks to obtain an aged emulsion. To this was added 95 parts suspensible calcium carbonate as an extender filler, followed by mixing to homogeneity to afford a water-repellent silicone water-based emulsion composition. This material was filled into cartridges, and adhesion and stability tests were conducted by the test methods described in Example 2. These results are respectively reported in Tables 5 and 6. Relative to Example 2, a smaller elongation was observed in the adhesion test, and the storage stability was also observed to be inferior in the storage stability test.

TABLE 5

| Mortar Butt Joint Adhesion Test | | |
|---|---|---|
| breaking strength | (kg/cm$^2$) | 3.3 |
| 150 percent modulus | (kg/cm$^2$) | 1.9 |
| elongation | (percent) | 300 |
| adhesive cohesion | | thin layer cohesive rupture |

TABLE 6

| | Storage Stability Test | | |
|---|---|---|---|
| | | properties | |
| test conditions | hardness (JIS) | tensile strength (kg/cm$^2$) | elongation (percent) |
| room temperature, after 1 month | 26 | 6.6 | 900 |
| room temperature, after 8 months | 42 | 9.9 | 500 |

Example 3

As a first step, 10 parts silicone water-based emulsion B as in Example 1 and 1 part water-based curing catalyst emulsion C as in Example 1 were added and mixed to homogeneity into 100 parts silicone water-based emulsion A as in Example 1, and the obtained mixture was allowed to stand open at room temperature for 1 week to afford a stable silicone water-based emulsion. To this were added 72 parts suspensible calcium carbonate as an extender filler, 1.2 parts vinylon short fiber (2 mm length) as a sprayability improver, and 1 part gammaglycidoxypropyltrimethoxysilane as an adhesion promoter, followed by mixing to homogeneity to produce a water-repellent silicone water-based emulsion composition. Even when this composition was allowed to stand at room temperature for 6 months, no hydrogen gas evolution was observed, thus indicating that the composition was stable.

The obtained water-repellent silicone water-based emulsion composition was filled into a spray gun (from Iwata Tosoki Kogyo Kabushiki Kaisha), and was then sprayed on a test wall at an air pressure of from 4 kg/cm$^2$ to 5 kg/cm$^2$ in order to evaluate the sprayability. The test wall was a slate board to which a porous-surface primer (Primer B from Toray Silicone Co., Ltd.) had been applied and dried as an undercoat. The water-repellent silicone water-based emulsion composition was diluted in order to reduce the viscosity by means of the addition of a suitable quantity of water, and was then uniformly and evenly sprayed on the test wall, followed by curing in a thermostat at 20° C./55 percent RH for 14 days. The external appearance, adhesive strength, post-immersion adhesive strength, aging resistance, and water permeability of the coating were measured, and these results are reported in Table 7.

Evaluation and measurement were carried out as follows.
1. Sprayability

Points of observation: Could the water-repellent silicone water-based emulsion composition coating material be used to the very last without waste, flowing smoothly from the spray guns's pot to the nozzle during spraying, without remaining on the walls of the pot? Did it drip from the nozzle?

2. Irregular pattern formation

After first spraying flat and then spraying in beads, the status of the obtained irregular pattern was inspected visually.
3. Adhesive strength and water permeability
   In accordance with JIS A 6910.
4. Aging resistance
   A test specimen coated with the water-repellent silicone water-based emulsion composition was exposed in a sunshine carbon-arc weatherometer for 300 hours. Discoloration, loss of gloss, creasing, bulging, and exfoliation were inspected visually, and chalking was evaluated by touch.
5. Hardness
   In accordance with JIS K 6301.
6. Tensile strength and elongation
   In accordance with JIS A 6021.

Since the cured film obtained from the water-repellent silicone water-based emulsion composition of the present invention has an excellent alkali resistance, it stood to reason that its adhesive strength after immersion in water would be excellent.

TABLE 7

| Test as a Water-Repellent Decorative Material | | |
|---|---|---|
| sprayability | | good |
| irregular pattern | | good |
| adhesive strength | (kg/cm$^2$) | 9 |
| adhesive strength after immersion in water | (kg/cm$^2$) | 8.5 |
| aging resistance | | no abnormalities |
| water permeability | (mL) | 0 |
| hardness | (JIS A) | 14 |
| tensile strength | (kg/cm$^2$) | 10 |
| elongation | (percent) | 1100 |

Comparison Example 3

As a first step 0.3 part water-based curing catalyst emulsion C identical to the component (C) of Example 1 and 5 parts aqueous silica (30 weight percent solids) stable in the alkaline region were added and mixed into 100 parts silicone water-based emulsion A identical to component (A) in Example 1, the pH was adjusted to 11 by the addition of a small quantity of diethylamine, and an aged emulsion was then obtained by aging at room temperature for 2 weeks. To this was added 72 parts suspensible calcium carbonate as an extending filler and 1.2 parts vinylon short fiber (length about 2 mm) as a sprayability improver, followed by mixing to homogeneity to afford a water-repellent silicone water-based emulsion composition. This was evaluated as a water-repellent decorative material by the methods described in Example 3, and these results are reported in Table 8. Since this material has a poor alkali resistance, it stood to reason that its adhesive strength after immersion in water would be reduced.

TABLE 8

| Test as a Water-Repellent Decorative Material | | |
|---|---|---|
| sprayability | | good |
| irregular pattern | | good |
| adhesive strength | (kg/cm$^2$) | 10 |
| adhesive strength after immersion in water | (kg/cm$^2$) | 5 |
| aging resistance | | no abnormalities |
| water permeability | (mL) | 0 |
| hardness | (JIS A) | 19 |
| tensile strength | (kg/cm$^2$) | 12 |
| elongation | (percent) | 770 |

Example 4

The stability of component (B) was investigated. First, 89 parts water and 1 part trimethylnonanol were added and mixed into 10 parts of a trimethylsiloxy-terminated methylhydrogenpolysiloxane having a silicon-bonded hydrogen atom content of 0.75 weight percent and 10 siloxane repeat units (MHPS-I), and this was passed twice through an homogenizer at a pressure of 300 kg/cm$^2$ to obtain a methylhydrogenpolysiloxane-containing silicone water-based emulsion. This was allowed to stand in order to investigate any changes in its status, but absolutely no problems appeared over a period of more than 1 year. A normal elastomer was obtained by curing the water-repellent silicone water-based emulsion composition prepared by mixing 10 parts of this material with 100 parts of the silicone water-based emulsion A from Example 1 and 1 part of the water-based curing catalyst emulsion C from Example 1. This same behavior was observed for a dimethylhydrogensiloxy-terminated methylhydrogenpolysiloxane having 0.75 weight percent silicon-bonded hydrogen atoms and 10 siloxane repeat units (MHPS-II).

The stability of a trimethylsiloxy-terminated methylhydrogenpolysiloxane having 1.6 weight percent silicon-bonded hydrogen atoms and 50 siloxane repeat units (MHPS-III, pendant groups are essentially methylhydrogen) was investigated as above, and these results are reported in Table 9. Thus, one concludes that the stability of component (B) is governed by the content of silicon-bonded hydrogen atoms in the methylhydrogenpolysiloxane.

TABLE 9

| | composition of component (B) | | | |
|---|---|---|---|---|
| | methylhydrogenpolysiloxane (parts) | trimethylnonanol (parts) | water (parts) | time until gelation of component (B) |
| MHPS-I | 10 | 1 | 89 | ≧1 year |
| MHPS-II | 10 | 1 | 89 | ≧1 year |
| MHPS-III | 10 | 1 | 89 | 16 days |
| MHPS-III | 20 | 2 | 78 | 7 days |
| MHPS-III | 30 | 3 | 67 | 7 days |

That which is claimed is:

1. Silicone water-based emulsion composition which provides a water-repellent material, said composition consisting of the mixture of (A) a silicone water-based emulsion composed of emulsifying agent, water, and diorganopolysiloxane, the organo groups being monovalent organic groups selected from the group consisting of alkyl, alkenyl, aryl, aralkyl, alkaryl, cycloalkyl and these groups in which all or part of the hydrogen atoms have been replaced by halogen, and having at least 2 silicon-bonded hydroxyl groups in each molecule;

(B) a silicone water-based emulsion composed of emulsifying agent, water, and organohydrogen-polysiloxane, the organo groups being monovalent hydrocarbon groups, and having at least 2 silicon-bonded hydrogen atoms in each molecule, containing 1 or less weight percent silicon-bonded hydrogen atoms in each molecule, and having no aliphatically unsaturated hydrocarbon groups, said organohydrogen-polysiloxane having a viscosity of from 1 to 1,000,000 centipoises at 25° C. and being present in sufficient amount to provide at least one hydrogen atom for each hydroxyl group in the diorganopolysiloxane of component (A);

(C) 0.01 to 5 parts by weight per 100 parts by weight of the diorganopolysiloxane of (A) of curing catalyst; and optionally (D) a filler; and wherein said components (A) and (B) are each prepared in advance separately from the other components.

2. The emulsion of claim 1 where the diorganopolysiloxane of (A) has a molecular weight of at least 50,000.

3. The emulsion of claim 2 where the curing catalyst is dioctyltindilaurate.

4. The emulsion of claim 3 where there is also present a filler (D).

* * * * *